United States Patent
Hoeppner et al.

(10) Patent No.: US 7,371,301 B2
(45) Date of Patent: May 13, 2008

(54) MULTILAYER SECURITY DOCUMENT AND METHOD FOR THE PRODUCTION THEREOF

(75) Inventors: Harald Hoeppner, Berlin (DE); Thomas Loeer, Berlin (DE); Detlef Maertens, Berlin (DE)

(73) Assignee: Bundesdruckerei GmbH, Berlin (DE)

( * ) Notice: Subject to any disclaimer, the term of this patent is extended or adjusted under 35 U.S.C. 154(b) by 403 days.

(21) Appl. No.: 10/492,204

(22) PCT Filed: Oct. 4, 2002

(86) PCT No.: PCT/EP02/11170

§ 371 (c)(1), (2), (4) Date: Oct. 6, 2004

(87) PCT Pub. No.: WO03/035388

PCT Pub. Date: May 1, 2003

(65) Prior Publication Data

US 2005/0037206 A1 Feb. 17, 2005

(30) Foreign Application Priority Data

Oct. 22, 2001 (DE) .................. 101 51 280

(51) Int. Cl.
*B29C 65/02* (2006.01)
*B29C 65/48* (2006.01)
*B32B 37/30* (2006.01)
*B32B 38/04* (2006.01)

(52) U.S. Cl. ...................... 156/250; 156/270

(58) Field of Classification Search ............ 430/2, 430/4, 15, 18, 502, 533, 945; 156/265, 270, 156/250; 283/85, 86; 359/3
See application file for complete search history.

(56) References Cited

U.S. PATENT DOCUMENTS 3,658,526 A * 4/1972 Haugh .................. 430/1

(Continued)

FOREIGN PATENT DOCUMENTS

EP 0 858 056 A 8/1998

(Continued)

OTHER PUBLICATIONS

WO 89 00742 A published Jan. 26, 1989.

(Continued)

*Primary Examiner*—Philip Tucker
*Assistant Examiner*—Sing P. Chan
(74) *Attorney, Agent, or Firm*—Arent Fox LLP

(57) ABSTRACT

A multilayer security document is proposed, wherein a printable carrier material (30) is connected to at least one at least partially transparent outer film or one at least partially transparent outer film composite (10). A photopolymer layer composite (30) is provided between the outer film or the outer film composite (10) and the carrier material (30), the photopolymer layer composite consisting of a photopolymer layer (24), the photopolymer layer being glued on both sides to a photopolymer outer film (22, 26). Information can be exposed into at least one region of the photopolymer layer (24). The photopolymer layer composite (20) is connected to the outer film or the outer film composite (10) and the carrier material (30). An inexpensive method for producing this multilayer security document is also proposed.

12 Claims, 2 Drawing Sheets

U.S. PATENT DOCUMENTS

Figure 1:
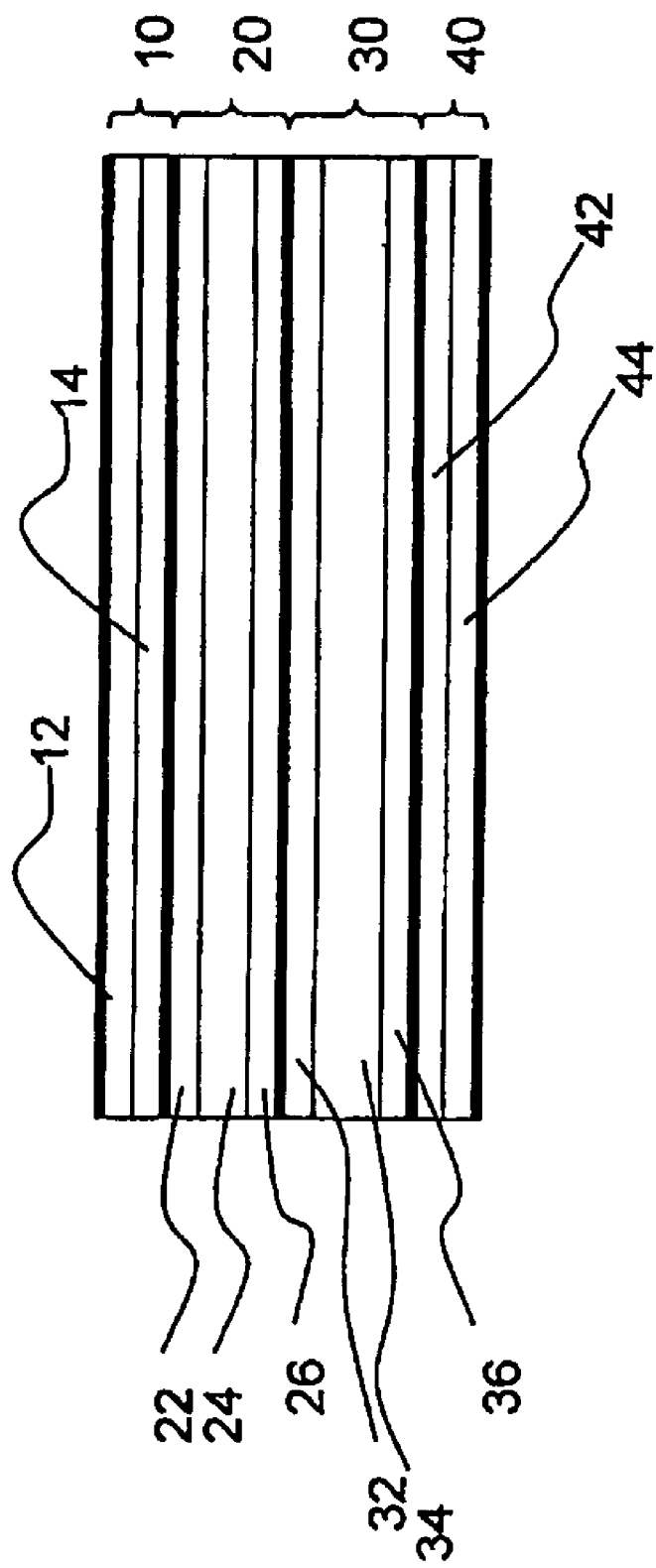

| | | | |
|---|---|---|---|
| 4,171,864 A | | 10/1979 | Klaus et al. |
| 4,269,473 A | | 5/1981 | Detlev et al. |
| 4,381,329 A | * | 4/1983 | Dallmann et al. .......... 428/204 |
| 4,696,876 A | * | 9/1987 | Cael .............................. 430/1 |
| 5,318,816 A | * | 6/1994 | Yin et al. ................... 428/41.8 |
| 6,541,189 B1 | * | 4/2003 | Caporaletti et al. ......... 430/396 |

FOREIGN PATENT DOCUMENTS

| | | |
|---|---|---|
| FR | 2 129 198 A | 10/1972 |
| JP | 10-95864 * | 4/1998 |

OTHER PUBLICATIONS

WO 00 50238 A published Aug. 31, 2000.

* cited by examiner

MULTILAYER SECURITY DOCUMENT AND METHOD FOR THE PRODUCTION THEREOF

CROSS-REFERENCE TO RELATED APPLICATION

This application is a National Stage entry of International Application No. PCT/EP02/11170, filed Oct. 4, 2002, the entire specification claims and drawings of which are incorporated herewith by reference.

PRIOR ART

The invention is based on a multilayer security document and a method for producing a multilayer security document according to the independent claims. A multilayer security document is already known from WO 00/50238 in which a printable carrier material is provided on both sides with an outer film applied by lamination or an outer film composite. It is also known from WO 00/50238 that the outer films are laminated onto the printable carrier material as rolls after extrusion coating with a laser-active plastics material.

ADVANTAGES OF THE INVENTION

The multilayer security document according to the invention with the features of the independent claim by contrast has the advantage that further security features can be introduced into the security document, these security features being very difficult to access for imitations and forgeries. Advantageous developments and improvements to the security document indicated in the independent claim are possible by virtue of the measures listed in the dependent claims. It is particularly advantageous to manufacture the photopolymer outer film of the layer composite with additional security features from polyethylene as the polyethylene may be easily joined to the other components of the multilayer security document. To provide a multilayer security document of excessive thickness and a sufficient number of Bragg network planes for the volume holograms which are introduced into the photopolymer layer, it is advantageous to configure the photopolymer layer such that it is not substantially thicker than 50 µm. It is also advantageous to protect the carrier material with an at least partially transparent outer film composite or an at least partially transparent outer film. It is particularly advantageous in this case to make this protective layer scratch-resistant. The laser-active construction of layers of the multilayer security document advantageously allows introduction of further security elements into the security document.

The method according to the invention for producing a multilayer security document with the features of the independent claim has the advantage that additional security features, which a potential forger will find difficult to access, can be introduced into a multilayer security document with minimal additional expenditure. Advantageous developments and improvements to the method indicated in the independent claim are possible due to the measures stated in the dependent claims. It is particularly advantageous that exact orientation of the various components of the security document can be achieved. It is also advantageous that the method does not require much more space. The use of low temperatures and pressures for applying the outer film or the outer film composite is also advantageous. The production costs can thus be kept low. It is also advantageous that roller conveyors are manufactured in such a way that complex conveying mechanisms (as in the manufacture of sheets) can be avoided. Surface patterns can advantageously be impressed into the security document, these patterns representing additional security features which further increase the forgery-proof nature of the document.

Further advantages of the multilayer security document according to the invention and of the method according to the invention for producing a multilayer security document can be inferred from the following description.

DRAWINGS

Figure 2:
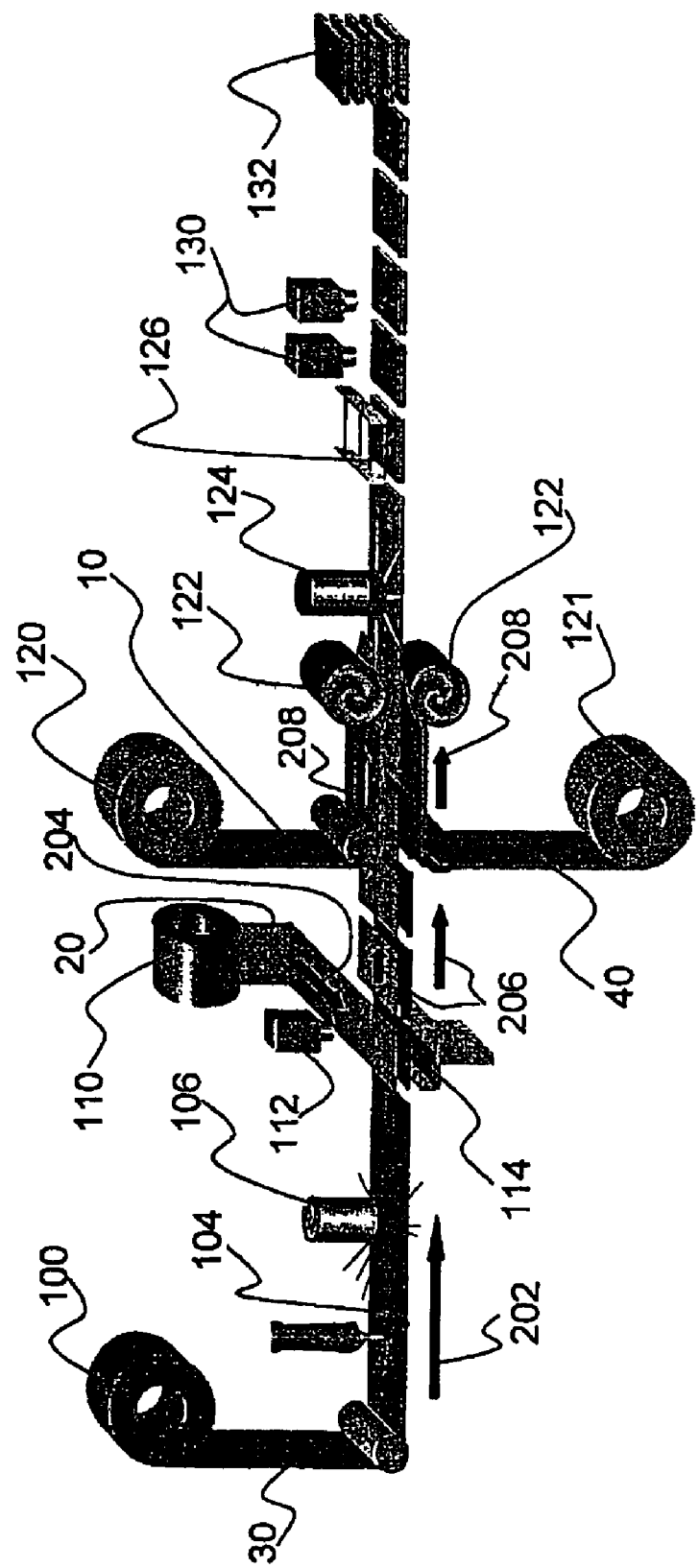

Embodiments of the invention are illustrated in drawings and are described in more detail in the following description. In the drawings:

FIG. 1 shows a multilayer security document according to the invention (schematically in cross-section) and FIG. 2 shows a method according to the invention for producing a multilayer security document (schematically).

DESCRIPTION OF THE EMBODIMENTS

FIG. 1 schematically shows a multilayer security document according to the invention in cross-section. It consists of a carrier material 30 which is printable and can consist of a security paper or a plastics material. This carrier material has security elements, such as guilloches or watermarks and is printable. The printable components of the carrier material are provided before assembly of the multilayer security document. Various printing methods, for example gravure (for example dye-stamping gravure printing), letter press printing (for example flexographic printing), flat-bed printing (for example litho printing) or screen printing can be used for this purpose. In a particularly preferred embodiment the carrier material 30 consists of a layer composite, the paper or plastics material ticking 34 being provided on both sides with at least partially transparent plastics material coatings 32, 36.

The carrier material 30 is joined to an outer film or an outer film composite 10. The outer film or the outer film composite 10 has the function of protecting the carrier material against environmental influences, for example against scratching. The outer film composite 10 therefore preferably has a two layer construction and preferably has a scratch-resistant polyester layer 12 facing the outer side of the document. A polyethylene layer 14 is arranged therebelow facing the carrier material 30. The outer film or the outer film composite 10 is at least partially transparent.

According to the invention, a photopolymer layer composite 20 is arranged between the outer film or the outer film composite 10 and the carrier material 30, information being exposed in this layer composite. Information of this type is preferably in the form of volume holograms providing additional security features for the multilayer security document. In a particularly preferred embodiment the photopolymer layer composite 20 has a three-layer construction, the actual photopolymer layer 24 that carries the information being provided on both sides with a respective photopolymer outer film 22, 26. This photopolymer outer film is preferably formed from polyethylene. Therefore, the photopolymer outer film 22 is joined to the polyethylene layer 14 of the outer film or of the outer film composite 10 while the photopolymer outer film 26 is joined to the polyethylene coating of the paper or plastics material ticking 34. Polyethylene coatings are thus advantageously joined together in each case here, and this joining can take place with inexpensive apparatus and minimal costs. The photopolymer layer composite 20 is at least partially transparent as is the photopolymer layer 24 and the photopolymer outer film 22, 26 therefore.

In a preferred embodiment the carrier material 30 has, on the side on which no photopolymer layer composite 20 is provided, a further outer film composite or a further outer film 40, this being directly applied to the carrier material 30. Similarly to the outer film or outer film composite 10, the further outer film or the further outer film composite 40 has, in a preferred embodiment, a polyethylene layer facing the carrier material and a scratch-resistant polyester layer 44 facing the outer side of the multilayer security document. The carrier material is thus also protected against wear on this side of the security document. The further outer film or the further outer film composite 40 is at least partially transparent.

In a further preferred embodiment, a photoemulsion can be provided between carrier material 30 and photopolymer layer composite 20. Information, for example a passport photo can be exposed into this photoemulsion. In a particularly preferred embodiment a backing emulsion is arranged in this case between carrier material 30 and further outer film or the further outer film composite 40, the emulsion preventing the deformation of the carrier material caused by the photoemulsion.

Additional information can also be introduced into the multilayer security document between various layers by using the above-mentioned printing methods. For example, information can be printed between carrier material 30 and photopolymer layer composite 20, between the polyethylene 14 or the polyester 12 of the outer film or of the outer film composite 10 or the polyethylene 42 and the polyester 44 of the further outer film or of the further outer film composite 40 or the carrier material 30 and the further outer film and the further outer film composite 40. Holograms or security strips may also be arranged between said layers of the multilayer security document.

In a further preferred embodiment layers of the multilayer security document can be laser-active, i.e. such that the layers are subjected to a change in colour, a change in the light transmitting capacity or a change in the layer thickness when irradiated by means of a laser. Such a local change in the properties of the corresponding layer allows the introduction of information. The photopolymer outer films 22 and/or 26 and/or the outer film or the outer film composite 10 (here preferably the polyethylene layer 14 facing the carrier material) and/or the further outer film or the further outer film composite 40 (here preferably the polyethylene layer 42 facing the carrier material) and/or the transparent plastics material coatings 32 and/or 36 of the carrier material 30 are preferably laser-active.

The method according to the invention for producing the multilayer security document according to the invention shown in FIG. 1 is shown schematically in FIG. 2 and is to be described hereinafter. In this case the method begins at the left-hand side of the drawing and ends at the right-hand side. The directions of movement of the materials are identified in FIG. 2 by an arrow, each of which has a reference numeral. In the following statements only the reference numeral of the respective arrow will be given. Reference will be made hereinafter to the production of the multilayer security document shown with reference to FIG. 1. The detailed construction of the main components outer film or outer film composite 10, photopolymer layer composite 20, carrier material 30 and further outer film or further outer film composite will not be discussed separately again, rather reference is made to the above.

The carrier material 30 in the form of a roll 100 is unwound from this roll and then provided with a bonding agent 104. The carrier material 30 unwound from the roll 100 continues to move in the direction 202. In a particularly preferred embodiment the bonding agent 104 is then dried by means of a heater 106.

The photopolymer layer composite 20 located on a roller conveyor 110 is unwound from the roll in the next step and supplied to the carrier material 30 on the side on which the bonding agent 104 is provided. The above-mentioned already developed information (for example volume holograms) is introduced into the photopolymer layer 24 of the photopolymer layer composite 20 (not shown in FIG. 2). In a preferred embodiment the photopolymer layer composite 20 is supplied laterally, as shown in FIG. 2. This means that the direction 204 in which the photopolymer layer composite 20 is unwound is substantially perpendicular to the direction 202 in which the carrier material 30 is unwound. However, in a further embodiment it is also possible to configure the invention in such a way that the device 204 in which the photopolymer layer composite 20 is unwound, runs parallel to the direction 202 in which the carrier material is unwound.

In the preferred embodiment shown in FIG. 2 orientation of the photopolymer layer composite 20 and of the carrier material 30 is also performed with the aid of a reader 112 and the positioning markings located on the carrier material 30 and the photopolymer layer composite 20, 50 the two materials are exactly joined. After the photopolymer layer composite 20 has been supplied the composite of photopolymer layer composite 20 and carrier material 30 is punched out by means of a punch 114 to form individual copies. This is particularly necessary in this preferred embodiment as the unwinding directions of the carrier material 30 and of the photopolymer layer composite 20 do not run parallel to one another. Punching out the individual copies at this instant is not necessary in the embodiment already discussed, which is likewise possible and in which the two unwinding directions run parallel to one another.

The composite of carrier material 30 and photopolymer layer composite accordingly continues to move jointly in one of the unwinding directions of the carrier material or of the photopolymer layer composite, the progressive movement direction 206 corresponding, in the embodiment shown in FIG. 2, to the unwinding direction of the carrier material 202. In a further step the outer film 10 located on a roller conveyor 120 or the outer film composite 10 located on a roller conveyor 120 is supplied above the photopolymer layer composite. The feed direction 208 corresponds to the direction 206 in which the composite of photopolymer layer composite 20 and carrier material 30 moves. All layers are subsequently laminated by means of heated pressure rollers 122, i.e. joined together by applying pressure and heat. The laminating temperature is between 100° C. and 200° C., preferably between 100° C. and 150° C. In a preferred embodiment the accordingly joined composite of outer film or outer film composite 10, photopolymer layer composite 20 and carrier material 30 is cooled in a subsequent step by means of a cooling unit 124, preferably a fan.

In a further preferred embodiment a further outer film 40 located on a roller conveyor 121 or a further outer film composite 40 located on a roller conveyor 121 is supplied at the same time as the supply of the outer film composite located on a roller conveyor 120 or of the outer film 10 on the underside of the carrier material 30. The supply device 208 of the lower outer film or of the further outer film composite 40 corresponds to the supply device of the outer film or of the outer film composite 10. In this preferred embodiment, the outer film or the outer film composite 40 is laminated at the same time as all other components of the multilayer security document (outer film or outer film composite 10, photopolymer layer 20 and carrier material 30) by applying heat and pressure by means of heated pressure rollers 122, and in a preferred embodiment, is cooled. In this case the multilayer security document thus produced consists of the components: outer film or outer film composite 10, photopolymer layer composite 20, carrier material 30 and further outer film or the further outer film composite 40.

In a further step the multilayer security documents still located on a roller conveyor are punched exactly into individual copies by means of a punch 126. In a further preferred embodiment, the surface of the security document is high-relief embossed or deep embossed in order to introduce tactile security elements, by means of embossing elements, before, during or after punching out the individual copies. The location of embossing is therefore either the outer film or the outer film composite 10 and/or the further outer film or the further outer film composite 40 or (in the absence of the further outer film or of the further outer film composite 40) the carrier material 30. The impressed surface patterns can be configured at least partially as a microfont. The impressed surface patterns can also be configured in such a way that, at least partially they contain lens structures.

In a development of the photopolymer layer composite 20 with a photopolymer outer film 22 and/or 26, which is (are) laser-active, and/or in a laser-active configuration of the outer film or of the outer film composite 10 and/or of the further outer film or of the further outer film composite 40 and/or of the carrier material 30, information can be introduced into the corresponding layers by means of known laser devices once the carrier material 30 has been unwound from the roll 100 or once the photopolymer layer composite 20 and carrier material 30 have been joined together or once the carrier material 30 and the photopolymer layer composite 20 and the outer film or the outer film composite 10 and/or the further outer film and/or the further outer film composite 40 have been laminated. The information can be introduced on the basis of colour changes or changes in the light transmission capacity or changes in the layer thickness (for example removal or expansion of the layer).

In a further preferred embodiment the security features located in the security documents or the introduced data is then read by means of one or more readers 130 and checked with the defaults. The punched-out individual copies are finally stacked in a further step 132 after a successful check. The faulty security documents will have been sorted out in advance.

The invention claimed is:

1. A method for producing a multilayer security document consisting of a printable carrier material and at least one at least partially transparent outer film or one at least partially transparent outer film composite, comprising the following steps:
    a) at least partial coating of the carrier material located on a roller conveyer with a bonding agent,
    b) supplying a photopolymer layer composite located on a roller conveyer to the side of the carrier material provided with the bonding agent, the photopolymer layer composite comprising a photopolymer layer glued on opposite sides to a first and second photopolymer outer film, the first and second photopolymer outer films comprising plastics material, the photopolymer layer and the photopolymer outer films being at least partially transparent and information being exposed into at least one region of the photopolymer layer,
    c) supplying the outer film located on a roller conveyor or the outer film composite located on a roller conveyor above the photopolymer layer composite,
    d) joining the outer film, the photopolymer layer composite and the carrier material by means of heated pressure rollers,
    e) punching out individual copies in the carrier material by means of a punching device.

2. The method according to claim 1, wherein during supply with the carrier material, the photopolymer layer composite is oriented with the aid of a position mark located on the photopolymer layer composite and a further positioning mark located on the carrier material, the positioning marks being read in advance by means of a positioning mark reader.

3. The method according to claim 1, wherein the bonding agent is dried by means of a heater before supply of the photopolymer layer composite.

4. The method according to claim 1, wherein the photopolymer layer composite is supplied laterally, the direction of movement of the photopolymer layer composite being substantially perpendicular to the direction of movement of the carrier material.

5. The method as in any one of claims 1 to 4, wherein individual copies are punched out of the carrier material with the photopolymer layer composite by means of punching device prior to supply of the outer film or of the outer film composite.

6. The method as in any one of claims 1 to 4, wherein the device supplying the outer film of the outer film composite extends substantially parallel to the direction of movement of the carrier material with photopolymer layer composite.

7. The method according to claim 1, wherein a further outer film located on a roller conveyor or a further outer layer composite located on a roller conveyor is additionally supplied to the side of the carrier material not containing the photopolymer layer composite, prior to connection of carrier material, photopolymer layer composite and outer film or outer film composite.

8. The method according to claim 7, wherein joining of the outer film or of the outer film composite, not located on the side of the photopolymer layer composite, and of the photopolymer layer composite and of the carrier material and of the outer film or of the outer film composite on the side of the photopolymer layer composite is carried out in the same working step by means of heated pressure rollers.

9. The method as in any one of claims 1 to 4, wherein the temperature during joining of carrier material, photopolymer layer composite and outer film or outer film composite is in the range between 100° C. and 20020 C.

10. The method as in any one of claims 1 to 4, wherein the data and security features contained in the security document are checked after punching out of the individual copies, by means of one or more readers.

11. The method as in any one of claims 1 to 4, wherein a surface structure is impressed into the security document before and/or during and/or after punching out.

12. The method according to claim 11, wherein the surface structure is constructed at least partially as a microfont and/or at least partially as a lens structure.

* * * * *